United States Patent
Donoghue et al.

(10) Patent No.: US 7,359,038 B1
(45) Date of Patent: Apr. 15, 2008

(54) PASSIVE DETERMINATION OF GROUND TARGET LOCATION

(76) Inventors: Patrick J. Donoghue, 11649 Pala Mesa Dr., Northridge, CA (US) 91326; David Y. Hsu, 29841 Quail Run Dr., Agoura Hills, CA (US) 91301

( * ) Notice: Subject to any disclaimer, the term of this patent is extended or adjusted under 35 U.S.C. 154(b) by 37 days.

(21) Appl. No.: 11/472,690

(22) Filed: Jun. 22, 2006

(51) Int. Cl.
*G01C 3/08* (2006.01)

(52) U.S. Cl. ............. 356/4.08; 342/458; 701/208; 701/225

(58) Field of Classification Search .......... 356/4.08
See application file for complete search history.

(56) References Cited

U.S. PATENT DOCUMENTS 4,173,414 A * 11/1979 Vauchy et al. ......... 356/139.08
4,954,837 A * 9/1990 Baird et al. ................. 342/458
5,568,152 A * 10/1996 Janky et al. ............ 342/357.08
5,969,676 A * 10/1999 Tran et al. .................. 342/442

* cited by examiner

*Primary Examiner*—Thomas H. Tarcza
*Assistant Examiner*—Timothy Brainard
(74) *Attorney, Agent, or Firm*—Patti, Hewitt & Arezina LLC (57) ABSTRACT

Ground targets can be passively identified on uneven terrain from an observation point elevation above a known reference point, a line-of-sight inclination angle, an azimuth angle and a digital terrain elevation database wherein actual elevations of surrounding latitude and longitude coordinates are stored and retrievable. Using the observation point's elevation above the known reference point and using the line-of-sight elevation angle from the observation point to the ground target, an initial estimate of the latitude and longitude coordinates of the ground target is made and used as an index into a digital terrain elevation database.

20 Claims, 6 Drawing Sheets

FIG. 6

PASSIVE DETERMINATION OF GROUND TARGET LOCATION

TECHNICAL FIELD

The invention relates generally to navigation and target location systems. More particularly, this invention relates to a passive target identification systems.

BACKGROUND

Prior art target location systems exist, which can identify the latitude, longitude and elevation of a distant target using a laser beam that is directed at the target from an observation point, the latitude, longitude and elevation of which is known. If the latitude, longitude and elevation of an observation point are known, the latitude, longitude and elevation of a point in space that is distant from the observation point can be easily determined using simple trigonometric formulae on the azimuth, elevation angle and distance between the observation point and the target.

Distance to a target point from an observation point can be easily and accurately determined by measuring the time required for a pulse of laser light to traverse the distance between the observation point where a laser is located and the target point. Laser beam elevation angle (positive and negative) and the beam's azimuth angle to a target point are also easily determined. Prior art target location systems that use a laser or other detectable signal are referred to herein as active target location systems.

A problem with prior art active target location systems is that laser light or other electromagnetic energy used to locate or mark a target can be detected. Sighting a target using laser light energy therefore announces to the world that the target is being lased. Using a laser to mark a target and/or determine a target's location therefore has drawbacks. Thus, a need exists for a method and apparatus by which coordinates of a target or other destination point in a three-dimensional space can be determined without having to announce to all those concerned that the target is being marked or lased.

SUMMARY

The invention in one implementation encompasses a passive method for locating a distant target from a known location. The method is to iteratively determine latitude and longitude coordinates for locations at, around or near a target. The latitude and longitude coordinates around the target are determined using a line-of-sight elevation angle between an observation point to the target. The observation point is elevated above the ground, which determines a reference point elevation. Azimuth angles are also used to calculate latitude and longitude coordinates of the target from the observation point.

When latitude and longitude coordinates are first determined, the actual elevation of the terrain immediately above the location they define is read from a digital terrain elevation database or DTED. If the terrain elevation above the calculated latitude and longitude is different than the elevation of the reference point elevation, the reference point elevation is adjusted and the calculations repeated until the reference point elevation matches or substantially matches the elevation of the coordinates of the target, in which case the target's latitude, longitude and elevation are precisely determined. No detectable radiation is needed to mark or locate the target.

DESCRIPTION OF THE DRAWINGS

Features of exemplary implementations of the invention will become apparent from the description, the claims, and the accompanying drawings in which:

DETAILED DESCRIPTION

Figure 1:
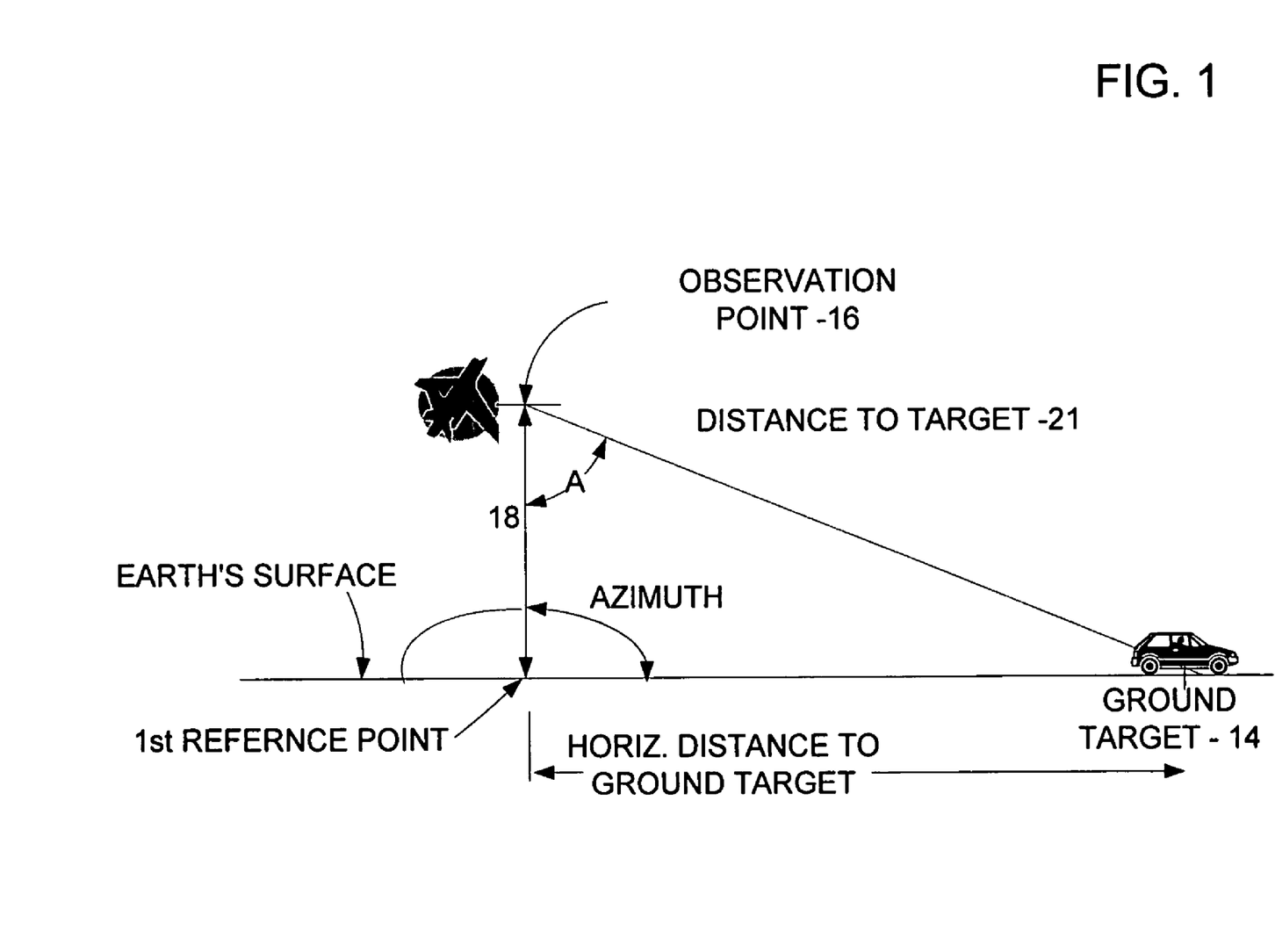
FIG. 1 is a representation of one implementation of a method for passively determining a ground target's location in the simple case where the target is coplanar with a reference point.

FIG. 1 demonstrates a method 10 for passively determining or identifying the location 12 of a ground target 14 from an observation point 16 for the trivial case where the observation point 16 and the target 14 are on the same flat, horizontal plane. As shown in the figure, the observation point 16 is directly above a first reference point 20 by a height or elevation 18. As is also known, the first reference point 20 will itself have an elevation with respect to sea level. The elevation of the first reference point could of course be greater than or less than or equal to sea level.

It is well known that every point on the Earth's surface 22 can be precisely identified by latitude and longitude coordinates. Since the first reference point 20 is located on the Earth's surface 22, it is unambiguously identified by latitude and longitude coordinates. Since the observation point 16 is directly above the first reference point 20 by a known elevation 18, the latitude and longitude of the first reference point 22 is known from the latitude and longitude of the first reference point 22 and the elevation 18 of the first observation point 16 above the first reference point 22. These three scalars (latitude and longitude of first reference point 22 and elevation of the observation point 18) unambiguously identify the observation point 16.

In light of the foregoing, a first step of passively determining the location of a remote or distant target 14 is to determine the latitude and longitude of the first reference point 22, which is depicted in FIG. 1 as being on the Earth's surface 22. A second step of passively determining the location of a remote target 14 is to determine the elevation 18 of the observation point 16 above the first reference point 22.

After the observation point 18 elevation 22 is determined, the next step of the method is to determine the line-of-sight elevation angle from the observation point 18 to the ground target 14. In addition to determining the line-of-sight elevation from the observation point 18 to the target 14, an additional step of determining the target location is to determine the azimuth angle from true north to the ground target 14 (not shown in FIG. 1). As used herein, azimuth is the angle measured about (i.e., around) the observation point 18 or the first reference point 22 between true north (or other reference point) and a vertical line passing through the center of the ground target 14. Those of ordinary skill in navigation usually measure azimuth angle in a direction that is clockwise from the north point (or other reference point) through 360 degrees.

Once the elevation 18 of the observation point 16 is known and the line-of-sight elevation angle and azimuth are known, latitude and longitude coordinates of the ground target 14 can be determined in the trivial case shown in FIG. 1 by using basic trigonometry. FIG. 1 is considered to depict a trivial or simple case of locating a remote target 14 because FIG. 1 depicts the target 14 and the first reference point 20 to be on a flat plane in which the Earth's curvature is ignored.

In the simple case shown in FIG. 1, the tangent of the line of sight elevation angle A, is determined by the quotient of the horizontal distance (along the x-axis) between the first reference point 22 and the elevation 18 of the observation point 18. The horizontal distance (along the x-axis) between the first reference point 22 and the target 14 is therefore determined by dividing the elevation distance 18 by the tangent of the elevation angle 'A.'

Once the distance between the first reference point 22 and the target 14 is known, the latitude and longitude coordinates of the target 14 can be determined from the horizontal distance to the target 14 from the first reference point 20 and by dividing the distance between the first reference point 22 and the target 14 by either the sine or cosine of the azimuth angle.

It should be noted that the line of sight distance 22 between the target 14 and the observation point 16 can also be determined by dividing the elevation 18 of the observation point 16 by the cosine of the angle A.

FIGS. 2-5 depict steps of a method 10 for passively determining or identifying the location 12 of a ground target 14 from an observation point 16 in the general case where the elevation of the target 14 is unknown. Key to the general case method, however, is a terrain database of actual elevations of points around the target 14 wherein there are stored, the actual elevation of the Earth's surface at various latitude and longitude coordinates. In some circles, a database wherein elevations of latitude and longitude coordinates are stored is referred to or known as a digital terrain elevations database or DTED. A DTED, which is not shown in the figures, is a database of latitude and longitude coordinates throughout a geographic region (or world wide) and the ground's elevation at each latitude and longitude coordinate pair.

Figure 2:
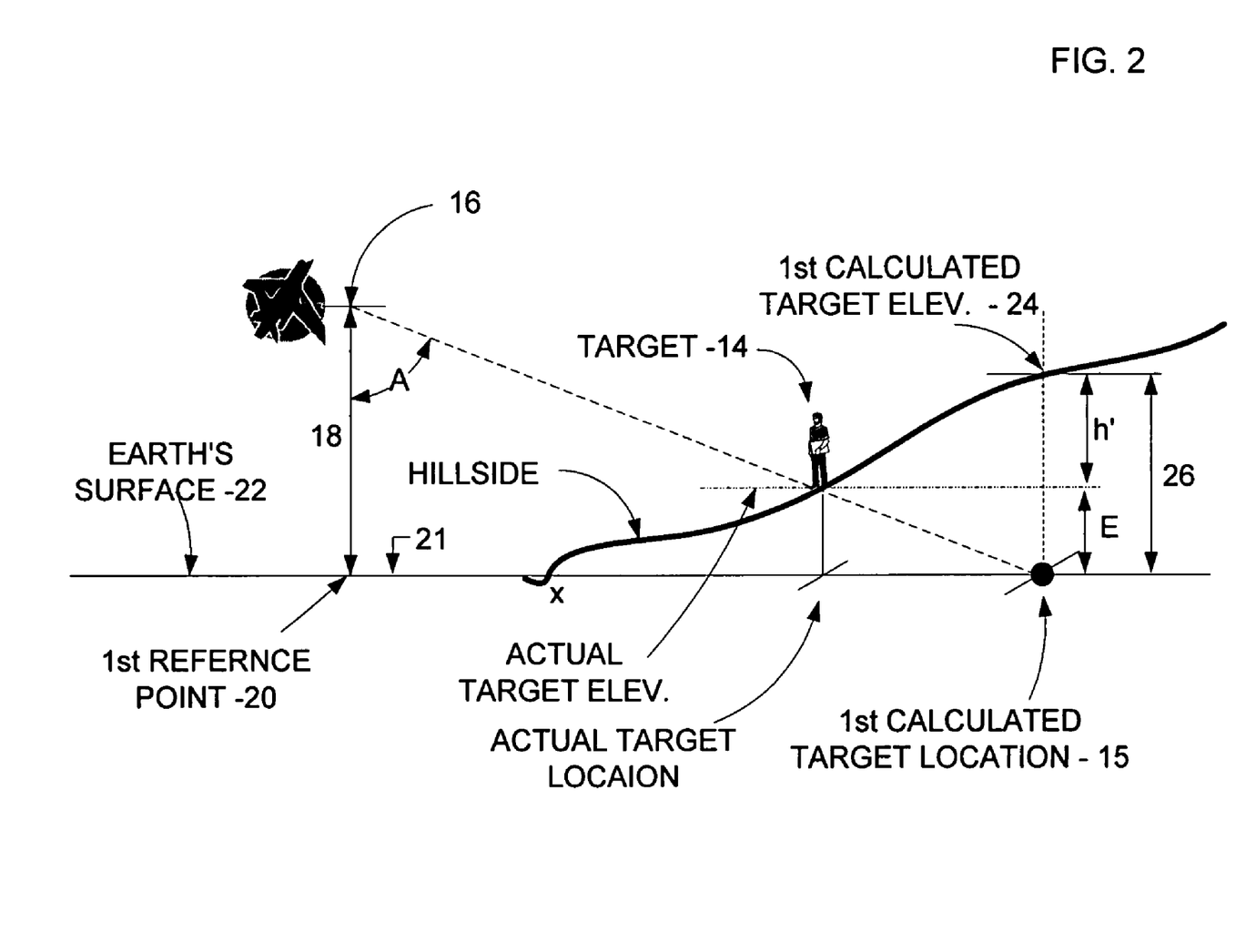
FIGS. 2-5 depict a second implementation of a method for passively determining a ground target's location by iteratively adjusting a reference point elevation until it is determined to be at the same elevation of the target.

As with the simple case shown in FIG. 1, the observation point 16 of FIG. 2 is directly above a first reference point 20 having an elevation 21. The observation point 16 is directly above the first reference point 20 at a known elevation 18 above the elevation 21 of the Earth's surface. The target 14, however, is shown to be on a mountainside or a hillside, at an unknown elevation 'E' above the elevation 21 of the first reference point 18. Because the target 14 in FIG. 2 is at an unknown elevation E above the first reference point 18, its latitude and longitude cannot be reliably determined as in the simple case shown in FIG. 1 because the trigonometric relationships used to locate the target 14 in the simple case described with respect to FIG. 1, work only with right triangles. The location of the target 14, i.e., its latitude, longitude and elevation, are determined by iteratively as described below.

In the general case of passively determining the location of a target shown in FIG. 2, when the target 14 is at an unknown elevation, simply dividing the elevation distance 18 by the tangent of the line-of-sight angle 'A' yields an incorrect result for the distance between the first observation point 20 and the target 14. Dividing the elevation 18, by the tangent of the observation point line-of-sight angle "A" yields a distance to the point identified in FIG. 2 by reference numeral 15, which point is referred to herein as the calculated target location 15 and which is well beyond the actual distance of the target 14 from the first reference point 20.

In order to passively determine a target's location when the target 14 is at an unknown elevation, the method of passively determining the target's location relies on a topographic map or a digital terrain elevation database or DTED (not shown), which contains the actual elevation 26 above sea level of latitude and longitude coordinates all around the target 14. The DTED includes the elevation of the point directly above the calculated target location 15, which is referred to herein as the calculated target elevation 24 as shown in FIG. 2. The elevation of the calculated target location 15 is the actual elevation of the point directly above the calculated target elevation 15, which point is determined from the elevation 18, the tangent of the line-of-sight inclination angle A and the azimuth angle, which is not shown in the figures for clarity.

Having determined the calculated target elevation 24 by reading it's elevation from a DTED using the latitude and longitude of the calculated target location 15, the next step of the general case method for passively determining a ground target's location is to determine the arithmetic difference between the calculated target location 24 and the first reference point elevation 21. In FIG. 2, the first reference point elevation 21 is the elevation of the first reference point 20.

In one embodiment, elevations of the various points used in the method are values with respect to sea level. So long as all elevations are with respect to sea level, the arithmetic difference between the first reference point elevation 21 and the calculated target elevation 24 will yield the elevation difference identified in FIG. 2 by reference numeral 26.

If the elevation difference between the first reference point elevation 21 and the calculated target elevation 24 is zero, the calculated target elevation 24 is the first reference point elevation 21. Therefore, the latitude and longitude coordinates of the calculated target location 15 can be determined using the simple case methodology described above with regard to FIG. 1 because the angle between the distance 18 and a line between the first reference point 18 and the target 14 is a right angle and conventional trigonometric relationships apply. When the calculated target elevation 24 and the first reference point elevation 21 are the same, the elevation of the target 14 is known.

If the elevation difference between the first reference point elevation 21 and the first calculated target elevation 24 is non-zero as shown in FIG. 2, the latitude and longitude coordinates of the calculated target location 15 will not correspond to the actual latitude and longitude coordinates of the target 14. This is because the trigonometric relationships used to calculate the latitude and longitude (and elevation) coordinates from the first reference point 20, the line-of-sight elevation angle A and the azimuth, apply only to right triangles. Thus, additional steps are required to passively determine the location of the target 14 when the target 14 is at an unknown elevation that happens to be different than the first reference point elevation 21.

Figure 3:
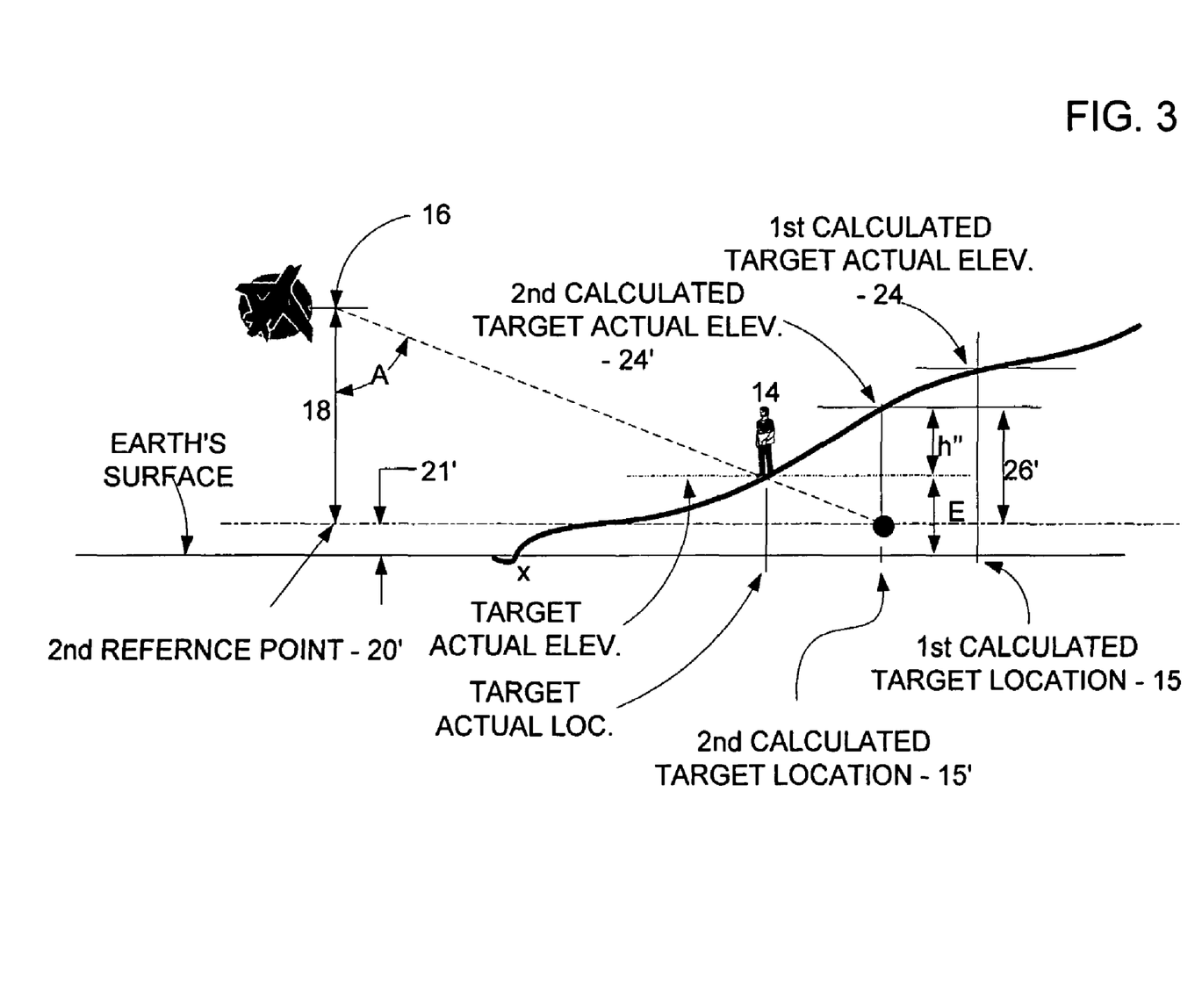

If the elevation difference between the first reference point elevation 21 and the first calculated target elevation 24 is non-zero as shown in FIG. 2, the next step of the method of passively determining the location of the target 14 is shown in FIG. 3.

Referring now to FIG. 3, the next step of the method is to increment (or decrement in an alternate embodiment) the first reference point elevation 21 by a predetermined amount, which defines a second reference point 20' (directly above the first reference point 20) and a second reference point elevation 21'. After defining a second reference point 20' and a second reference point elevation 21, the method of passively locating the target 14 determines a $2^{nd}$ calculated target location 15' latitude and longitude coordinates using the method described above with respect to FIG. 1. As shown in FIG. 3, the latitude and longitude coordinates of the $2^{nd}$ calculated target location 15' will of course yield from the DTED, an elevation, which is shown in FIG. 3 and referred to herein as the $2^{nd}$ calculated target elevation 24'.

After the $2^{nd}$ calculated target elevation 24' is determined, the next step of the method is to calculate the elevation difference between the $2^{nd}$ calculated target elevation 24' (as read from the DTED) and the second reference point elevation 21'. If the elevation between these two points is zero, the $2^{nd}$ calculated target elevation 24' is the same as the second reference point elevation 21'. The trigonometric relationships used in the simple method described with respect to FIG. 1 will apply in which case, the latitude and longitude coordinates of the second calculated target location 15' correspond to the latitude and longitude of the target 14 and elevation of the target 14 can be determined to be the $2^{nd}$ calculated target elevation 24'.

Figure 4:
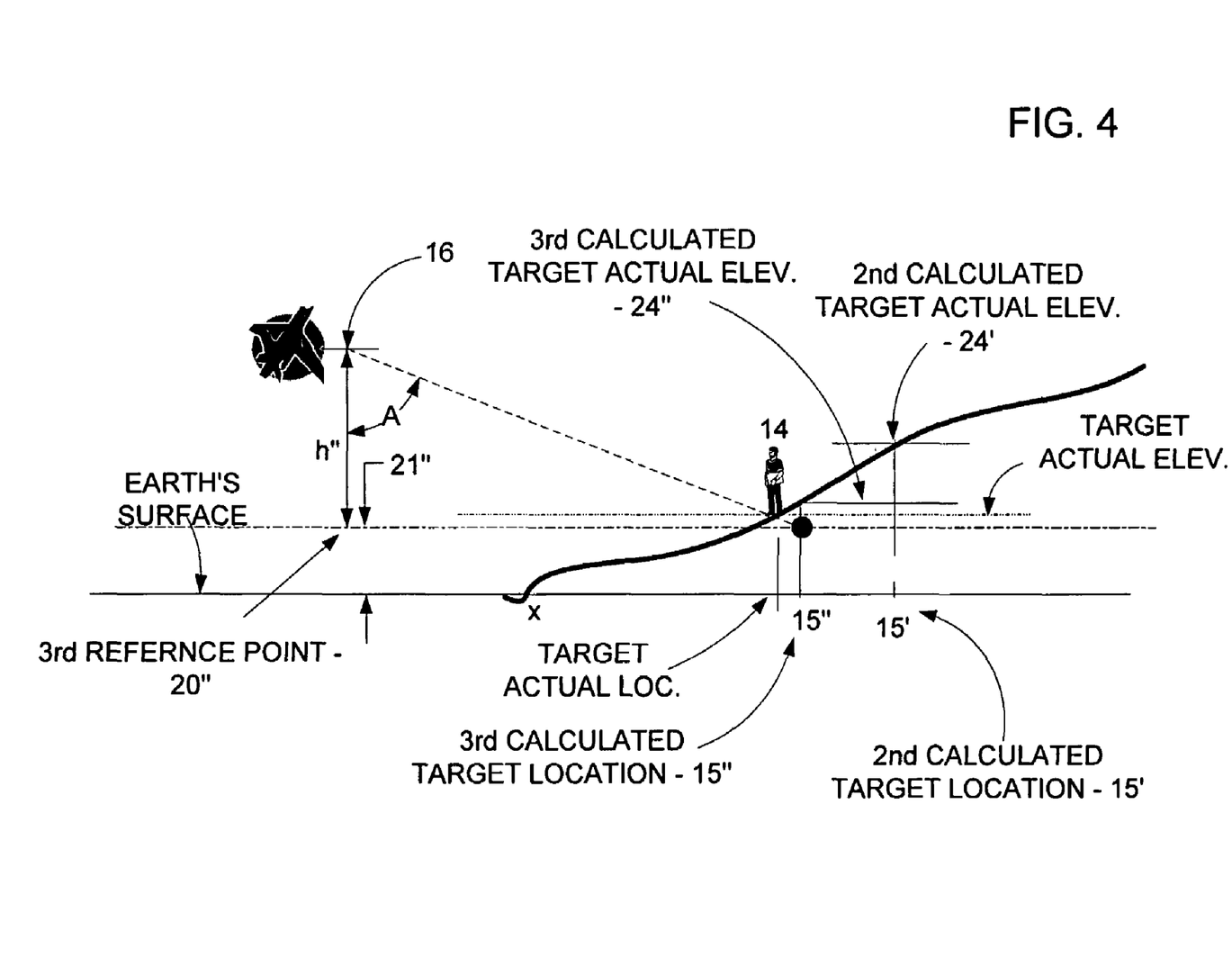

Referring now to FIG. 4, if the elevation difference between the second reference point elevation 21' and the $2^{nd}$ calculated target elevation 24' is non-zero, as shown in FIG. 3, the method of passively determining the location of the target 14 increments the second reference point elevation 21' to define a third reference point elevation 21''. In one embodiment, the second reference point elevation is incremented by the aforementioned predetermined amount although alternate embodiments of the method contemplate incrementing (and/or decrementing the second reference point elevation by other amounts). Incrementing the second reference point elevation defines a third reference point 20'' (directly above the first reference point 20) at a third reference point elevation 21''. After defining a third reference point 20'' with a third reference point elevation 21'', the method of passively locating the target 14 determines the latitude and longitude coordinates of a $3^{rd}$ calculated target location 15'' using the method described above with respect to FIG. 1.

Once the latitude and longitude coordinates of the $3^{rd}$ calculated target location 15'' are calculated from the line-of-sight elevation angle A and the azimuth angle, the coordinates are used as an index into the DTED from which an actual elevation of these coordinates is read and used to determine the $3^{rd}$ calculated target elevation 24''. After the $3^{rd}$ calculated target elevation 24'' is determined from the DTED, the next step of the method is to calculate the elevation difference between the $3^{rd}$ calculated target elevation 24'' and the third reference point elevation 21''. If the elevation between these two points is zero, the elevation of the $3^{rd}$ calculated target elevation is the same as the third reference point elevation 21'. The trigonometric relationships used in the simple method described with respect to FIG. 1 will apply. The latitude and longitude coordinates of the target 14 can be determined from the elevation of the observation point 16 above the third reference point elevation 21' the line-of-sight inclination angle 'A' and an azimuth angle for the target 14.

Figure 5:
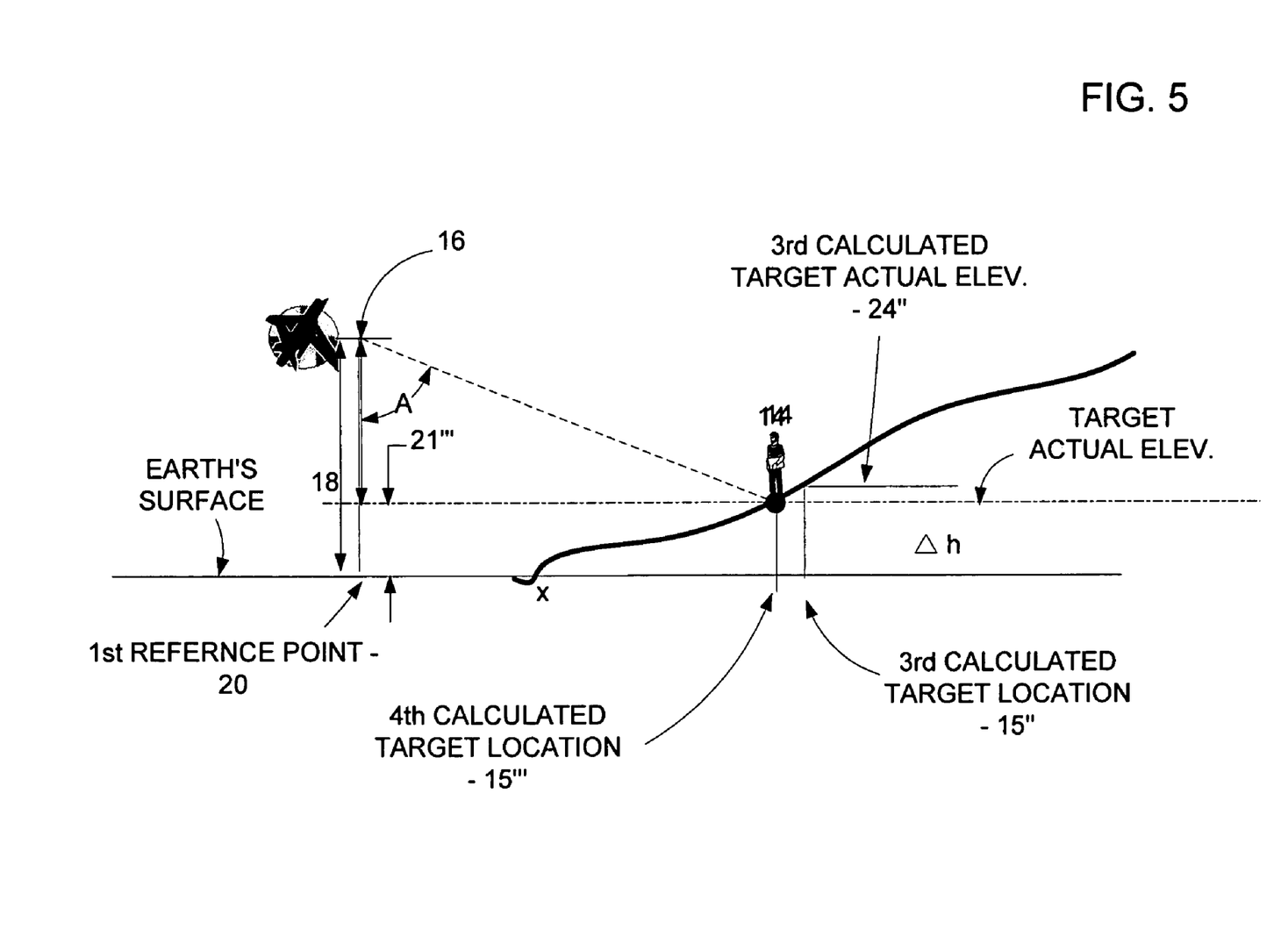

Referring now to FIG. 5, since the elevation difference between the second reference point elevation 21'' and the $2^{nd}$ calculated target elevation 24' was non-zero as shown in FIG. 3, the method of passively determining the location of the target 14 increments the second reference point elevation 21'' yet again to yield a third reference point elevation 21'''. Incrementing the second reference point elevation defines a fourth reference point 20''' directly above the first reference point 20 and a fourth reference point elevation 21'''. After defining a fourth reference point elevation 21''', the method of passively locating the target 14 determines the latitude and longitude coordinates of a $4^{th}$ calculated target location 15''' using the method described above with respect to FIG. 1.

The latitude and longitude coordinates of the $4^{th}$ calculated target location 15''' are used as an index into the DTED from which an elevation of these coordinates is read and used to determine the $4^{th}$ calculated target elevation 24'''. After the $4^{th}$ calculated target elevation 24''' is determined from the DTED, the next step of the method is to calculate the elevation difference between the $4^{th}$ calculated target elevation 24''' and the $4^{th}$ reference point elevation 21'''. If the elevation between these two points is zero, as shown in FIG. 5, the elevation of the $4^{th}$ calculated target elevation 24''' is the same as the $4^{th}$ reference point elevation 21'''. The elevation of the target 14 is determined and the trigonometric relationships used in the simple method described with respect to FIG. 1 will apply to determine the latitude and longitude coordinates of the target 14 from the elevation of the observation point 16 above the fourth reference point elevation 21''' the line-of-sight inclination angle 'A' and an azimuth angle for the target 14.

While the embodiment described above adjusted the reference point elevation by one or more fixed amounts in each iteration, an alternate embodiment of the method is to adjust the reference point elevation 21 by an amount equal to the difference between the calculated target elevation 24 and the reference point elevation. Such an alternate embodiment may be more computationally efficient than the method described above if the elevation differences are initially large, in which case a number of iterations required by the aforementioned method might be eliminated.

Figure 6:
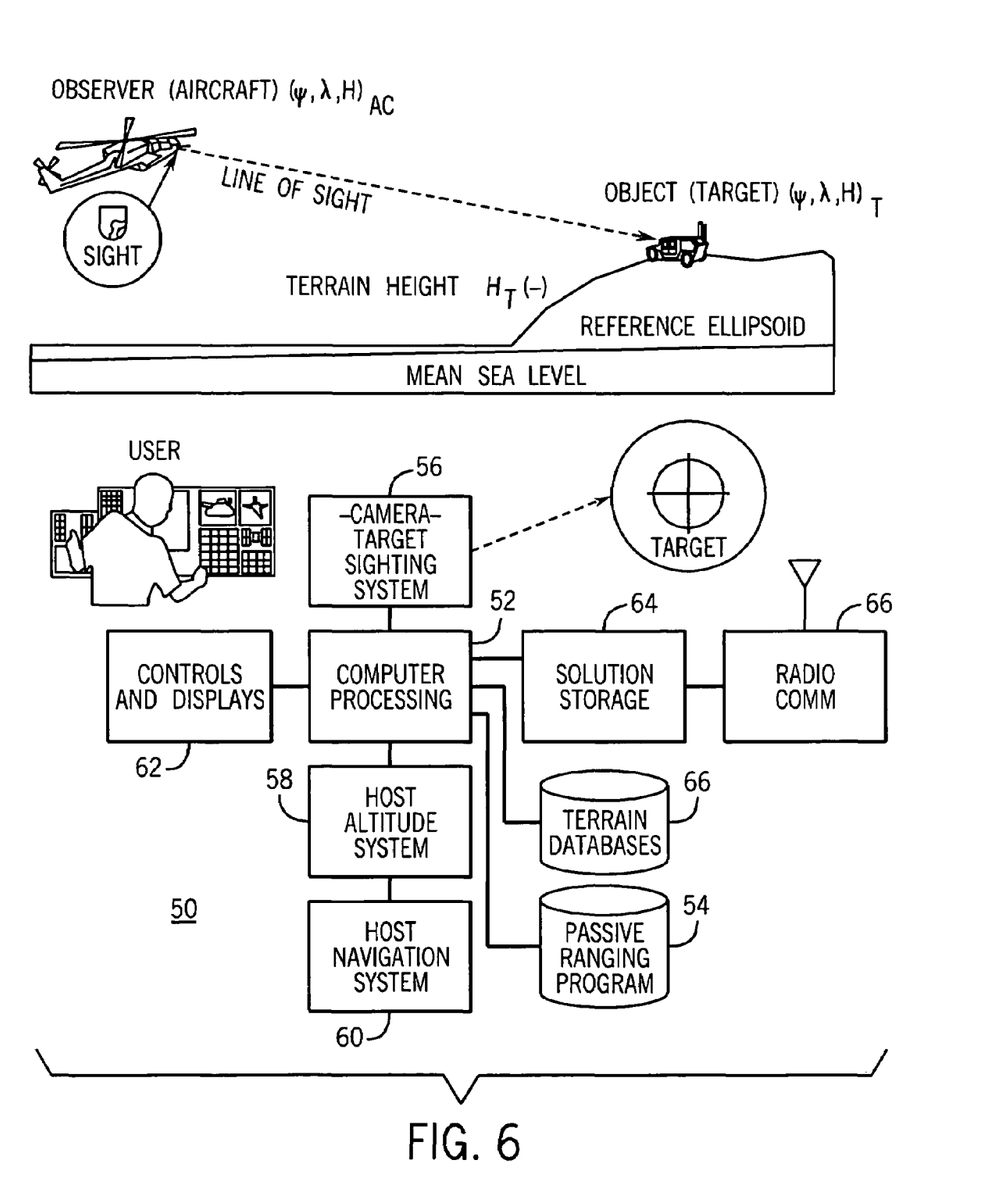
FIG. 6 depicts an apparatus for passively determining a ground target's location.

Referring now to FIG. 6, there is shown a block diagram of an apparatus 50 for passively determining a ground target's location. The apparatus 50 includes a computer or CPU 52 that is operatively coupled to a storage device 54 wherein computer program instructions are stored, which when executed cause the CPU to send signals and/or information to, and receive signals and/or information from, a camera target sighting system 56, a host attitude system 58, a host navigation system 60, controls and displays for an operator 62, a terrain data base 66, a solution storage device 64 and a radio 66.

The storage device 54 stores program instructions, which when executed cause the CPU to calculate the location of a ground target using the method described above. The storage device 54 can be implemented using a variety of semiconductor storage devices such as static and/or dynamic random access memory (RAM), ROM, EPROM and/or EEPROM devices, as they are known in the art. The storage device 54 can also be implemented using magnetic and/or optical disks.

In the course of executing program instructions stored in the storage device 54, the CPU determines the location of the system 50 from a host navigation system 60, the accuracy of which is important because the performance or accuracy of the method described above is dependent on the accuracy of the initial or starting location of an observation point. The more accurate the observation point 16 location is, the more accurate will be the determined location ground target 14.

In one embodiment, the host navigation system 60 provides real time latitude and longitude data of where an observation point 16 or observation aircraft is located. Examples of a host navigation system 60 include but are not limited to, a high-accuracy or an aided differential global positioning system or an inertial navigation system.

The CPU 52 also communicates with a host attitude system 58, which can provide inertial navigation but which also provides a heading reference and pitch and roll angles, of an aircraft or other vehicle in which the system is located.

A camera targeting system 56 coupled to the CPU sends data to the CPU 52 that indicates or represents the aforementioned angle of inclination between an observation point 16 and a ground target 14. Examples of a camera targeting system 56 include a color, black & white or infrared camera that can be directed to a target and which provides data to the CPU 52 that represents either absolute (with respect to the reference plane) or relative angles to a ground target 14. Other examples of a camera targeting system include a helmet mounted display (HMD) or a Target Sighting System (TSS).

A terrain database 66 coupled to the CPU 52 is implemented using devices such as those used to implement the storage device 54. The terrain database 66 stores representations of the height above sea-level for geo-registered points (having latitude and longitudinal coordinates) in a grid of points. In an alternate embodiment, the terrain database 66 stores a geoidal height model database.

Solutions that are computed by the CPU, i.e., locations of ground targets that have been passively computed, are stored in a solution storage device 64 coupled to the CPU 52. The identity of ground targets, which can include images of the targets, and their locations, which are stored in the solution storage 64, can be transmitted from the system 50 using a radio 66 that is also coupled to the CPU 52. Thus, target identity and location can be transmitted to distant centers in real time.

Finally, the controls and user interfaces 62 for the system 50 are also coupled to the CPU 52. The controls and user interfaces 62 include various displays and controls by which an operator can control the camera targeting system 56 and/or the transmission of target image and location data from the radio 66.

Those of ordinary skill in the navigation arts will recognize that passively locating a target, avoids having to use a laser or other energy source to mark or identify a target. Thus, announcing the fixation of the target by irradiating it with detectable energy is avoided and announcing the location of a person targeting a location by irradiating it is also avoided.

Those of ordinary skill in the art will also recognize that the efficacy of the method described above and the accuracy of its results directly depend on the line-of-sight angle measurement accuracy and the elevation measurement accuracy. Various methods and apparatus exist for measuring line-of-sight angles. Some of these devices include mounted camera, helmet mounted displays (HMD) used in prior art weapons aiming systems and prior art Target Sighting Systems (TSS).

The efficacy of the method and the accuracy of its results will also depend on how the latitude and longitude coordinates of the reference points are determined. Latitude and longitude coordinates can be determined from printed maps, inertial navigational systems but most accurately from the global positioning system.

Those of ordinary skill in the art will also recognize that the step of adjusting the first reference point elevation 21 can include numerous variations. If surrounding terrain is generally smooth or has gently rolling hills, the first increment of the first reference point elevation 21 could be specified to be relatively large, if the elevation difference between the first calculated target elevation 24 and the first reference 21 is large, which would correspond to a great distance between the reference point 20 and the first calculated target location. Conversely, the step of adjusting the first reference point elevation 21 could be specified to be very small, in mountainous areas of if a very accurate determination of the target's location was desired.

It should be noted that the step of determining the difference in elevation between a calculated target elevation and a reference point elevation need not be exactly zero. Differences in elevation between a calculated target elevation and a reference point elevation can be non-zero values to acknowledge the fact that minor variations in terrain around the target 14 may make it difficult to iteratively determine the exact elevation of the target 14.

Those of ordinary skill in the art will recognize that the method described above is best carried out by a computer. As described above, the general case of passively determining the location of a target requires a digital terrain elevation database or DTED. A computer that performs the calculations above is preferably coupled to a DTED so that it can read calculated target elevations as needed.

Finally, it should be noted that the steps described herein are just examples. The steps may be performed in a differing order, or steps may be added, deleted, or modified.

Although an example of the invention have been described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method of identifying the location of a ground target from an observation point that is at an elevation above a first reference point, the first reference point having an elevation above sea level and latitude and longitude coordinates, the method comprising the steps of:
    a) determining the observation point's elevation above the first reference point;
    b) determining the line-of-sight elevation angle from the observation point to the ground target;
    c) determining an azimuth angle to the ground target;
    d) calculating the latitude and longitude coordinates of the ground target using the latitude and longitude coordinates of the first reference point, the observation point elevation above ground, the line-of-sight elevation angle to the ground target and the azimuth angle to the ground target;
    e) reading from a data base, the earth's surface elevation above sea level at the ground target location determined from step d);
    f) determining the difference between the earth's surface elevation above sea level at the ground target location estimate determined from step d) and the earth's surface elevation above sea level at the first reference point determined in step a);
    g) if the result of step f) is zero or substantially equal to zero, determine the ground target location to be at an elevation above sea level determined in step e) and to have the longitude and latitude determined in step d);
    h) if the result of step f) is non-zero, determine a second reference point elevation from the difference obtained in step f) and then;
    i) assign the second reference point elevation determined in step h) to be the first reference point elevation to be used in a recalculation of step d); then ii) iteratively calculate steps d) to h) until the difference obtained in step f) is zero or substantially equal to zero.

2. The method of claim 1, wherein the step of calculating the latitude and longitude coordinates of the location of the ground target, further comprises the step of: calculating the latitude and longitude of the ground target from the latitude and longitude of the first reference point, using one of the sine and cosine of the line-of-sight elevation angle.

3. The method of claim 1, wherein the step of calculating the latitude and longitude coordinates of the location of the ground target, further comprises the step of: calculating the latitude and longitude of the ground target from the latitude and longitude of the first reference point, using one of the sine and cosine of the azimuth angle.

4. The method of claim 1, wherein the step of calculating the line of sight distance from the observation point to the ground target using one of the sine and cosine of the line-of-sight elevation angle.

5. The method of claim 1, further comprising the step of determining the latitude and longitude of the first reference point using a global positioning system.

6. A method of identifying the location of a ground target from an observation point that is at an elevation above a first reference point, the first reference point having an elevation above sea level and latitude and longitude coordinates, the method comprising the steps of:
 a) determining the observation point's elevation above the first reference point;
 b) determining the line-of-sight elevation angle from the observation point to the ground target;
 c) determining an azimuth angle to the ground target;
 d) calculating the latitude and longitude coordinates of the ground target using the latitude and longitude coordinates of the first reference point, the observation point elevation above ground, the line-of-sight elevation angle to the ground target and the azimuth angle to the ground target;
 e) reading from a data base, the earth's surface elevation above sea level at the ground target location determined from step d);
 f) determining the difference between the earth's surface elevation above sea level at the ground target location estimate determined from step d) and the earth's surface elevation above sea level at the first reference point determined in step a);
 g) if the result of step f) is zero or substantially equal to zero, determine the ground target location to be at an elevation above sea level determined in step e) and to have the longitude and latitude determined in step d);
 h) if the result of step f) is non-zero, determine a second reference point elevation from the difference obtained in step f) and the first reference point elevation, then:
  i) adjust the first reference elevation used in step d) by a predetermined amount, to be re-used in a re-calculation of step d); then
  ii) iteratively calculate steps d) to h) until the difference obtained in step f) is zero or substantially equal to zero.

7. The method claim 6, wherein step h) of adjusting the first reference point elevation further comprises the step of decreasing the first reference point elevation by a first amount.

8. The method claim 6, wherein step h) of adjusting the first reference point elevation further comprises the step of increasing the first reference point elevation by a first amount.

9. The method of claim 1, wherein the step of determining the line-of-sight elevation angle from the observation point to the ground target further comprises the step of determining the line-of-sight elevation using at least one of: a camera; a helmet mounted display (HMD); a Target Sighting System (TSS).

10. The method of claim 6, wherein the step of determining the line-of-sight elevation angle from the observation point to the ground target further comprises the step of determining the line-of-sight elevation using at least one of: a camera, a helmet mounted display (HMD), or a Target Sighting System (TSS).

11. An apparatus for passively determining the location of a ground target from an observation point, the apparatus comprising:
 a) a computer;
 b) camera targeting system coupled to said computer, which determines an angle of inclination between said ground target and said observation point;
 c) a navigation system coupled to said computer and which determines the location of said observation point;
 d) a terrain database coupled to said computer, said terrain database storing information about terrain around where a ground target is located;
 e) a storage device operatively coupled to said computer, said storage device storing computer program instructions, which when executed cause the computer to:
  i) determine the observation point's elevation above the first reference point;
  ii) determine the line-of-sight elevation angle from the observation point to the ground target;
  iii) determine an azimuth angle to the ground target;
  iv) calculate the latitude and longitude coordinates of the ground target using the latitude and longitude coordinates of the first reference point, the observation point elevation above ground, the line-of-sight elevation angle to the ground target and the azimuth angle to the ground target;
 wherein the computer program instructions cause the computer to:
  i) read from a data base, the earth's surface elevation above sea level at the around target location;
  ii) determine the difference between the earth's surface elevation above sea level at the around target location and the earth's surface elevation above sea level at the first reference point, and
  iii) if the result of step ii) is zero or substantially equal to zero, determine the ground target location to be at an elevation above sea level and to have the longitude and latitude determined in step (d)(iv);
  iv) if the result of step ii) is non-zero, determine a second reference point elevation for the ground target location and then;
  v) assign the second reference point elevation determined to be the first reference point elevation to be used in a recalculation of ground target location; then
  vi) iteratively calculate the location of the ground target until the difference is zero or substantially equal to zero.

12. The apparatus of claim 11, wherein the computer program instructions cause the computer to calculate the latitude and longitude of the ground target from the latitude and longitude of the first reference point, using one of the sine and cosine of the line-of-sight elevation angle.

13. The apparatus of claim 11, wherein the computer program instructions cause the using one of the sine and cosine of the azimuth angle.

14. The apparatus of claim 11, wherein the computer program instructions cause the computer to calculate a line of sight distance from the observation point to the ground target using one of the sine and cosine of the line-of-sight elevation angle.

15. The apparatus of claim 11, wherein the camera targeting system is comprised of: a camera; a helmet mounted display (HMD); a Target Sighting System (TSS).

16. The apparatus of claim 11, wherein the navigation system is comprised of: a global positioning system.

17. The apparatus of claim 11, wherein the navigation system is comprised of: an inertial navigation system.

18. An apparatus for passively determining the location of a ground target from an observation point, the apparatus comprising:
   a) a computer;
   b) camera targeting system coupled to said computer, which determines an angle of inclination between said ground target and said observation point;
   c) a navigation system coupled to said computer and which determines the location of said observation point;
   d) a terrain database coupled to said computer, said terrain database storing information about terrain around where a ground target is located;
   e) a storage device operatively coupled to said computer, said storage device storing computer program instructions, which when executed cause the computer to:
      i) determine the observation point's elevation above the first reference point;
      ii) determine the line-of-sight elevation angle from the observation point to the ground target;
      iii) determine an azimuth angle to the ground target;
      iv) calculate the latitude and longitude coordinates of the ground target using the latitude and longitude coordinates of the first reference point, the observation point elevation above ground, the line-of-sight elevation angle to the around target and the azimuth angle to the round target;
   wherein the computer program instructions cause the computer to: read from a data base, the earth's surface elevation above sea level at the ground target location determined from step d)(iv);
      i) determining the difference between the earth's surface elevation above sea level at the ground target location estimate determined from step d)(iv) and the earth's surface elevation above sea level at the first reference point;
      ii) if the result of step i) is zero or substantially equal to zero, determine the ground target location to be at an elevation above sea level determined in step d)(iv);
      iii) if the result of step i is non-zero, determine a second reference point elevation from the difference obtained in step d)(iv) and the first reference point elevation, then:
      iv) adjust the first reference elevation used in step d)(iv) by a predetermined amount, to be re-used in a re-calculation of steps d)(i)-d)(iv); then
      v) iteratively calculate until the difference obtained in step f) is zero or substantially equal to zero.

19. The apparatus of claim 18, wherein the camera targeting system is comprised of a camera, a helmet mounted display (HMD), or a Target Sighting System (TSS).

20. An apparatus for passively determining the location of a ground target from an observation point, the apparatus comprising:
   a) a computer;
   b) a targeting system means for determining an angle of inclination between said ground target and said observation point, said targeting system means being coupled to said computer;
   c) a navigation system means for determining the location of said observation point, said navigation system means being coupled to said computer;
   d) a terrain database coupled to said computer, said terrain database storing terrain data for an area wherein said ground target is located;
      i) a storage device coupled to said computer, said storage device storing computer program instructions to control said computer to determine the altitude and longitude and latitude of said ground target from data obtained from said targeting system means, said navigation system means and said terrain database;
   wherein the computer program instructions cause the computer to:
      i) read from a data base, the earth's surface elevation above sea level at the around target location;
      ii) determine the difference between the earth's surface elevation above sea level at the ground target location and the earth's surface elevation above sea level at the first reference point, and
      iii) if the result of step ii) is zero or substantially equal to zero, determine the ground target location to be at an elevation above sea level and to have the longitude and latitude determined in step (d)(iv);
      iv) if the result of step ii) is non-zero, determine a second reference point elevation for the ground target location and then:
      v) assign the second reference point elevation determined to be the first reference point elevation to be used in a recalculation of ground target location; then
      vi) iteratively calculate the location of the ground target until the difference is zero or substantially equal to zero.

* * * * *